(12) United States Patent
Zuo et al.

(10) Patent No.: US 9,736,225 B2
(45) Date of Patent: Aug. 15, 2017

(54) INFORMATION PROCESSING METHOD, AND PRIORITY INFORMATION SENDING METHOD AND DEVICE

(71) Applicant: ZTE CORPORATION, Shenzhen, Guangdong Province (CN)

(72) Inventors: Xiaofei Zuo, Shenzhen (CN); Quan Luo, Shenzhen (CN); Haiyan Ning, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 236 days.

(21) Appl. No.: 14/427,673

(22) PCT Filed: Jul. 19, 2013

(86) PCT No.: PCT/CN2013/079648
§ 371 (c)(1),
(2) Date: Mar. 12, 2015

(87) PCT Pub. No.: WO2013/178150
PCT Pub. Date: Dec. 5, 2013

(65) Prior Publication Data
US 2015/0249705 A1 Sep. 3, 2015

(30) Foreign Application Priority Data

Sep. 13, 2012 (CN) .......................... 2012 1 0338407

(51) Int. Cl.
*G06F 15/16* (2006.01)
*H04L 29/08* (2006.01)
*H04L 29/06* (2006.01)

(52) U.S. Cl.
CPC .......... *H04L 67/10* (2013.01); *H04L 63/0407* (2013.01); *H04L 63/10* (2013.01); *H04L 63/104* (2013.01)

(58) Field of Classification Search
CPC ..... H04L 67/10; H04L 63/0407; H04L 63/10; H04L 63/104
See application file for complete search history.

(56) References Cited

U.S. PATENT DOCUMENTS 8,396,452 B1 * 3/2013 Matsuoka ............... G06F 21/35
455/410
2002/0174213 A1 * 11/2002 Ibaraki .................... G10L 15/28
709/223

(Continued)

FOREIGN PATENT DOCUMENTS

CN 101321389 A 12/2008
CN 101351045 A 1/2009

(Continued)

*Primary Examiner* — Padma Mundur
(74) *Attorney, Agent, or Firm* — Ling Wu; Stephen Yang; Ling and Yang Intellectual Property

(57) ABSTRACT

The embodiment of the present invention provides a method for processing information and method for sending priority information and apparatus. The method for processing information includes: after receiving information sent to a logged-on account, according to the priority information corresponding to the account sent by a network side device, a terminal determining whether the priority thereof is the highest; the priority information comprises the identifiers and priorities of various terminals which log on the account; if yes, starting up a corresponding application program according to the received information; and if no, not starting up the application program corresponding to the received information. The method for sending priority information includes: a network side device determining various terminals which have already logged on the same account; for various terminals logging on the same account, the network side device sending the priority information of the account to various terminals.

8 Claims, 5 Drawing Sheets

(56) References Cited

U.S. PATENT DOCUMENTS

| | | | |
|---|---|---|---|
| 2007/0130155 A1* | 6/2007 | Alperin | H04L 41/0806 |
| 2007/0253407 A1 | 11/2007 | Wang et al. | |
| 2008/0031436 A1 | 2/2008 | Der et al. | |
| 2008/0233977 A1* | 9/2008 | Xu | H04W 8/205 |
| | | | 455/461 |
| 2010/0016008 A1 | 1/2010 | Brewer et al. | |
| 2010/0137015 A1 | 6/2010 | Blanco | |
| 2011/0225640 A1* | 9/2011 | Ganapathy | H04W 12/06 |
| | | | 726/8 |

FOREIGN PATENT DOCUMENTS

| | | |
|---|---|---|
| CN | 101924993 A | 12/2010 |
| CN | 102882944 A | 1/2013 |
| CN | 102883285 A | 1/2013 |
| JP | 2002116787 A | 4/2002 |
| JP | 2005323093 A | 11/2005 |
| JP | 2007094674 A | 4/2007 |
| JP | 2010263438 A | 11/2010 |
| JP | 2011077708 A | 4/2011 |
| JP | 2011176435 A | 9/2011 |
| JP | 2011186849 A | 9/2011 |
| JP | 2011528542 A | 11/2011 |
| WO | WO03071764 A1 | 8/2003 |
| WO | WO2012054012 A1 | 4/2012 |

\* cited by examiner

INFORMATION PROCESSING METHOD, AND PRIORITY INFORMATION SENDING METHOD AND DEVICE

TECHNICAL FIELD

The present document relates to the mobile communication field, and in particular, to a method for processing information, and a method for sending priority information and apparatus.

BACKGROUND OF THE RELATED ART

At present, the account of the mobile intelligent terminal can provide multiple services for the users, such as, managing the card folder, receiving and sending mails, sending IP messages, initiating network videophone and synchronizing time, etc., that is, multiple application programs use the same account. And, multiple mobile terminals can log on the same account at the same time, for example, they can log on different types of mobile terminals, such as the mobile phone, tablet PC, etc., or on multiple mobile terminals of which the types are same at the same time; in this way, when the users use the services related to that account in a certain mobile terminal, such as, updating the card folder, then the updated card folder will be uploaded to the server, and the users can see the updated card folder in other mobile terminals which log on that account.

However, when multiple terminals use the same account to log on, supposing that the user receives the immediate network videophone and the user only carries a certain mobile terminal while going out, now all mobile terminals which log on that account will receive the immediate network videophone and start the application program of the network videophone, and other people can answer the network videophone in other terminals which the user does not carry and which has already logged on that account; or when the user answers the network videophone in the carried mobile terminal, then the situation that the user answers the network videophone can be learnt in other terminals which the user does not carry and which has already logged on that account; in this way, the security of the information that the user performs the private communication through the network videophone is unable to be ensured.

In sum, when the same account is logged on by multiple mobile terminals, if there is the information sent to that account, then all mobile terminals which log on that account will receive that message and start the application program corresponding to the information, thus the information generated by the user using that account during the procedure of processing the started application program will be leaked, and then the private information of the user using that account is leaked.

SUMMARY OF THE INVENTION

The embodiment of the present invention provides a method for processing information and a method for sending priority information and apparatus, used for solving the problem that when the same account is logged on by multiple mobile terminals, all mobile terminals which log on that account will receive the message sent to the account and start the application program corresponding to the information, thus the information generated by the user using that account during the procedure of processing the started application program will be leaked, and then the private information of the user using that account is leaked.

Based on the above-mentioned problem, the embodiment of the present invention provides a method for processing information, comprising:

after receiving information sent to an account which has already been logged on, according to priority information of the account which is sent by a network side device, a terminal judging whether a priority of the terminal thereof is highest; wherein the priority information comprises identifiers of various terminals which log on the account and priorities corresponding to the identifiers;

if yes, then starting up a corresponding application program according to received information sent to the account which has already been logged on; if no, not starting up the application program corresponding to the received information sent to the account which has already been logged on.

The embodiment of the present invention further provides a method for sending priority information, comprising:

a network side device determining multiple terminals which have already logged on a same account;

for multiple terminals logging on the same account, the network side device sending priority information of the account to the multiple terminals respectively, wherein the priority information comprises identifiers of various terminals which log on the account and priorities corresponding to the identifiers.

The embodiment of the present invention further provides an apparatus for processing information, comprising:

a judgment module, configured to: after receiving an instruction that a terminal receives information sent to an account which has already been logged on, according to priority information of the account which is sent by a network side device, determine whether a priority of the terminal is highest; wherein the priority information comprises identifiers of various terminals which log on the account and priorities corresponding to the identifiers;

a first transmitting module, configured to: after determining that the priority of the terminal is highest, send an instruction of starting up an application program corresponding to the received information sent to the account which has already been logged on to the terminal; if no, not send the instruction of starting up the application program corresponding to the received information sent to the account which has already been logged on.

The embodiment of the present invention further provides an apparatus for sending priority information, comprising:

a determination module, configured to: determine multiple terminals which have already logged on a same account; and a second transmitting module, configured to: for multiple terminals logging on the same account, send priority information of the account to the multiple terminals respectively, wherein the priority information comprises identifiers of multiple terminals which log on the account and priorities corresponding to the identifiers.

The embodiment of the present invention provides a method for processing information and a method for sending priority information and apparatus, which makes that only the terminal of the highest priority in the terminals which log on the account will start the application program corresponding to the information, if there is the information sent to the account when the user logs on the same account in multiple terminals, and the terminal of the non-highest priority in the terminals which log on the account will not start the application program corresponding to the information, so the user using the account processes the information generated during the process of the started application program in the terminal of the highest priority which logs on the account, and it will not be leaked from the terminal of the non-highest priority which logs on the account, thus the privacy and the security of the private information of the user using the account is improved.

PREFERRED EMBODIMENTS OF THE PRESENT INVENTION

The embodiment of the present invention provides a method for processing information and a method for sending priority information and apparatus. When the user logs on the same account in multiple terminals, if receiving the information of the logged-on account, the terminal determines at first whether the priority of the terminal oneself is the highest according to the priority information of the account received from the network side device; only the terminal with the highest priority will start the application program corresponding to the information, thus guaranteeing the privacy and the security of the private information of the user using the account.

The specific implementation modes of a method for processing information and a method for sending priority information and apparatus provided by the embodiment of the present invention are described with reference to the accompanying drawings of specification hereinafter. It should be illustrated that, in the case of not conflicting, the embodiments in the present application and features in these embodiments can be combined with each other at random.

Figure 1:
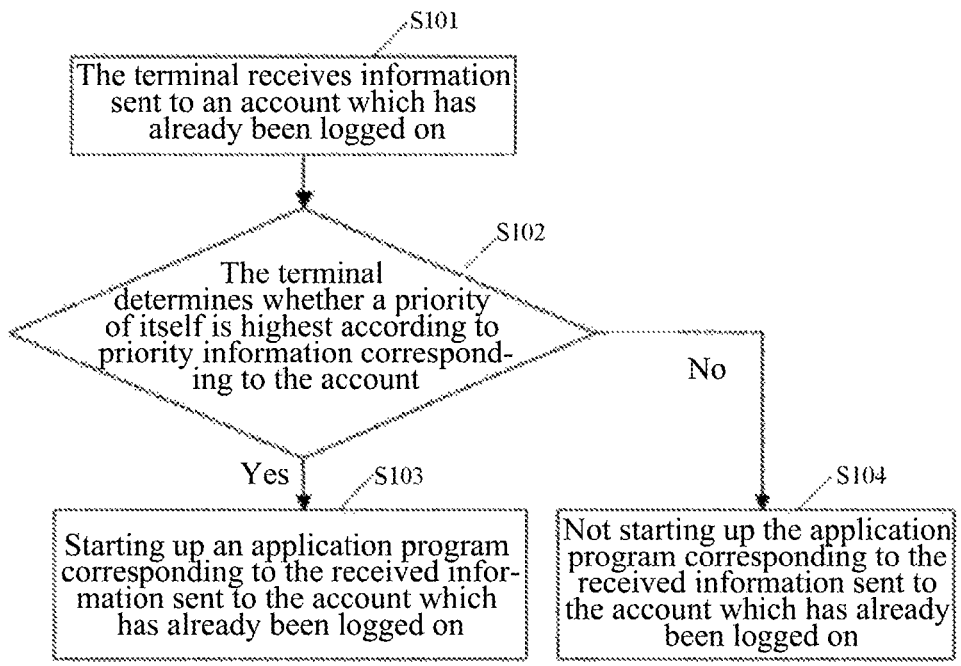
FIG. 1 is one of the flow charts of a method for processing information provided by an embodiment of the present invention.

A method for processing information provided by the embodiment of the present invention includes the following steps, as shown in FIG. 1.

In S101, the terminal receives information sent to an account which has already been logged on.

In S102, according to priority information of the account which is sent by a network side device, the terminal determines whether a priority of itself is highest; wherein the priority information includes identifiers of various terminals which log on the account and priorities corresponding to the identifiers; if yes, then step S103 is executed; if not, step S104 is executed.

In S103, the terminal starts up a corresponding application program according to received information sent to the account which has already been logged on.

In S104, the terminal does not start up the application program corresponding to the received information sent to the account which has already been logged on. In a certain specific application scene, the terminal A, the terminal B and the terminal C all log on the account S, and at a certain moment, the terminal A, the terminal B and the terminal C all receive the information of the account S, and the terminal A, the terminal B and the terminal C determine respectively whether its own priority is the highest according to their received priority information of the account S. If only the priority of terminal A is the highest, then only the terminal A will start the application program corresponding to the received information sent to the account S, and the user who uses the account S can only process the information in the terminal A; because the priorities of the terminal B and terminal C are not the highest, although the terminal B and terminal C receive the information of the account S, they will not start the application program corresponding to the received information; therefore, other people cannot learn the situation that the user who uses the account S processes the information sent to the account S in the terminal A from the terminal B and terminal C, thus improving the privacy and security of the private information of the user which uses the account S.

It should be illustrated that there is not only one terminal of the highest priority, and multiple terminals of the highest priority can be set depending upon needs.

The above-mentioned logged-on account refers to that the same account can be applied to multiple application programs, that is, multiple application programs use the same account. While during the real practice, the user can be configured to judge the priority of the terminal itself only after receiving the information of some certain application programs of the logged-on account, while not judge its own priority after receiving all information of the logged-on account.

Figure 2:
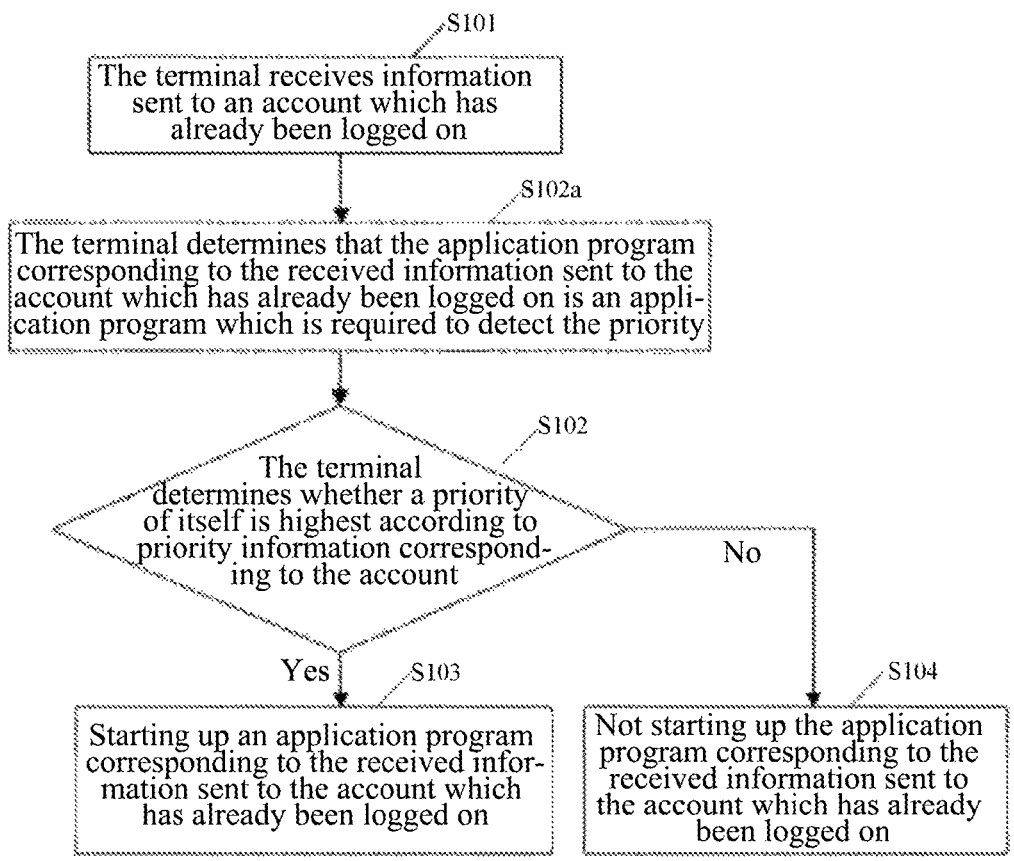
FIG. 2 is a second of the flow charts of a method for processing information provided by an embodiment of the present invention.

Therefore, a method for processing information provided by the embodiment of the present invention, after step S101 and before step S102, further includes the step S102a, as shown in FIG. 2.

In step S102a, the terminal determines that the application program corresponding to the received information sent to the account which has already been logged on is an application program which is required to detect the priority of the terminal.

The terminal is required to detect its own priority only after the terminal receives the application program, sent to the logged-on account, which is required to detect its own priority, and the user can only process the information corresponding to these programs in the terminal of the highest priority. While the terminal is not required to judge the priority of the terminal itself after receiving the information corresponding to other application programs sent to the account, that is, the user can process the information in any terminal which receives the information corresponding to other application programs sent to the account.

For example, the user logs on the account S in all of the terminal A, the terminal B and the terminal C, and the terminal A is in the highest priority, and the terminal B and the terminal C are not in the highest priority. The account S provides the services of the network videophone, the mail and the calendar synchronization, that is, the user can use the application programs of the network videophone, the E-mail and the calendar synchronization after logging on the account S. Supposing that the user sets the network videophone and E-mail as the application program required to detect the priority of the terminal, while the calendar synchronization is not the application program required to detect the priority of the terminal; therefore, the terminal A, the terminal B and the terminal C will judge their own priorities respectively after receiving the information of the network videophone or E-mail, and only the terminal with the highest priority, that is, the terminal A can start up the application program of the network videophone or E-mail, and the user can only process the received information in the terminal A; and although the terminal B and the terminal C will receive the information of the network videophone or the E-mail, they will not start up the corresponding application program, and the user cannot process the information in the terminal B and the terminal C. However, if what the terminal A, the terminal B and the terminal C receive are the information of the calendar synchronization, then the terminal A, the terminal B and the terminal C will all start up the application program of the calendar synchronization, and the user can process the information in any terminal of the terminal A, the terminal B and the terminal C.

Preferably, the above-mentioned priority information of the account is stored in each terminal which logs on the account, and every time the terminal receives the priority information of the account sent by the network side device, the previous priority information of the account sent by the network side device will be replaced by the newly received priority information of the account.

Preferably, before the terminal receives the priority information of the account, which has been logged on by the terminal, sent by the network side device, the method further includes: after the terminal receives the priority switchover instruction sent by the network side device and the identifier of the terminal logging on the account, a priority switchover program is started up, and the priority information set by the user is sent to the network side device after determining that the user needs to perform the priority switchover.

In a certain application scene, the terminal A, the terminal B and the terminal C all log on the account S, and before the network side device sends the priority information of the account S to all terminals which log on the account S, that is, the terminal A, the terminal B and the terminal C, the network side device firstly sends the priority switchover instruction and the identifier of the terminal which logs on the account S to the terminal A, the terminal B and the terminal C. During the real application, the Mobile Equipment Identifier (MEID) of each terminal can be taken as the identifier of the terminal, that is, the network side device sends the MEID of the terminal A, the MEID of the terminal B and the MEID of the terminal C to each terminal which logs on the account S. The terminal A, the terminal B and the terminal C which receive the priority switchover instruction start their own priority switchover programs and then display the received identifiers of the terminals which log on the account S, that is, the MEID of the terminal A, the MEID of the terminal B and the MEID of the terminal C, and the user can set the priorities for the terminal A, the terminal B and the terminal C in any terminal, and then the terminal will send the priority information of the account S set by the user to the network side device. The priority information includes the corresponding relation of the identifiers of all terminals which have already logged on the account S and the priorities of the terminals which have already logged on the account S.

The identifier of the terminal, besides the MEID of each terminal, further can be any other information which can identify one terminal uniquely.

Figure 3:
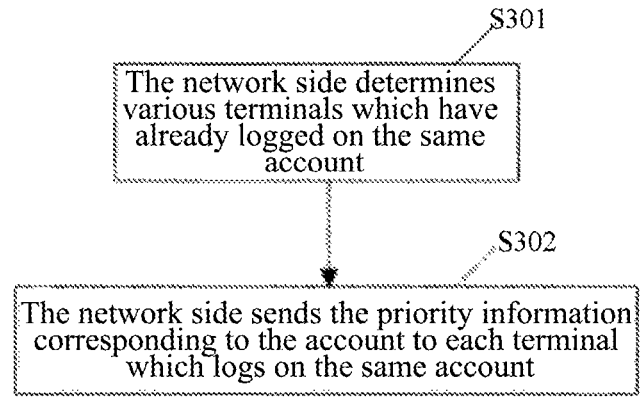
FIG. 3 is one of the flow charts of a method for sending priority information provided by an embodiment of the present invention.

The embodiment of the present invention further provides a method for sending priority information, as shown in FIG. 3, including the following steps.

In S301, the network side device determines various terminals which have already logged on the same account.

In S302, for various terminals logging on the same account, the network side device sends the priority information of the account to various terminals, wherein the priority information includes the identifier of each terminal which logs on the account and the priority corresponding to the identifier.

Figure 4:
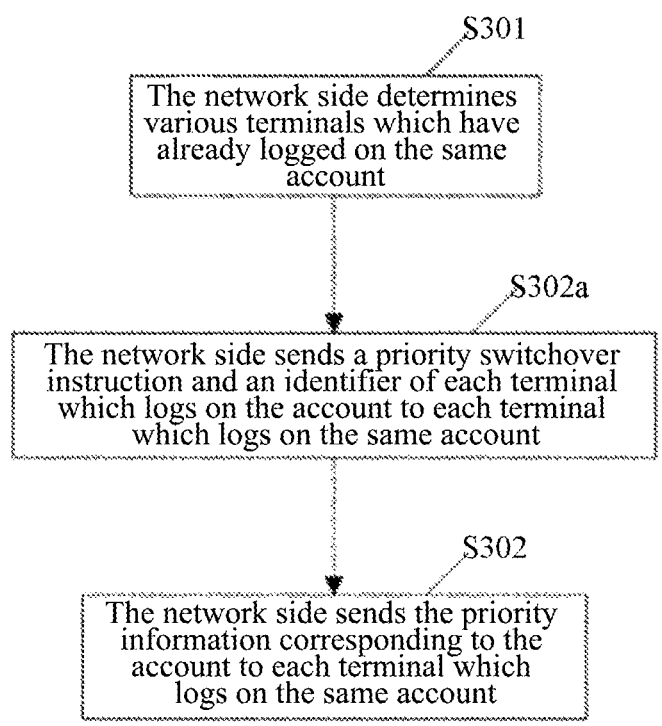
FIG. 4 is a second of the flow charts of a method for sending priority information provided by an embodiment of the present invention.

Because the network side device will store the priority information of multiple accounts, the network side device should determine the terminal which has logged on the account at first when sending the priority information of a certain account to the terminal, and then it sends the priority information of the account to each terminal which logs on the account As shown in FIG. 4, after the network side device determines the terminal which has already logged on the account and before the network side device sends the priority information of the account to various terminals which log on the same account, the method further can include the following steps.

In S302a, the network side device sends a priority switchover instruction and the identifier of each terminal which logs on the account to each terminal which logs on the account.

The priority switchover instruction and the identifier of each terminal which logs on the account are used for notifying each terminal which logs on the account to start up the priority switchover program and send the priority information set by the user to the network side device after determining that the user needs to perform the priority switchover.

Figure 5:
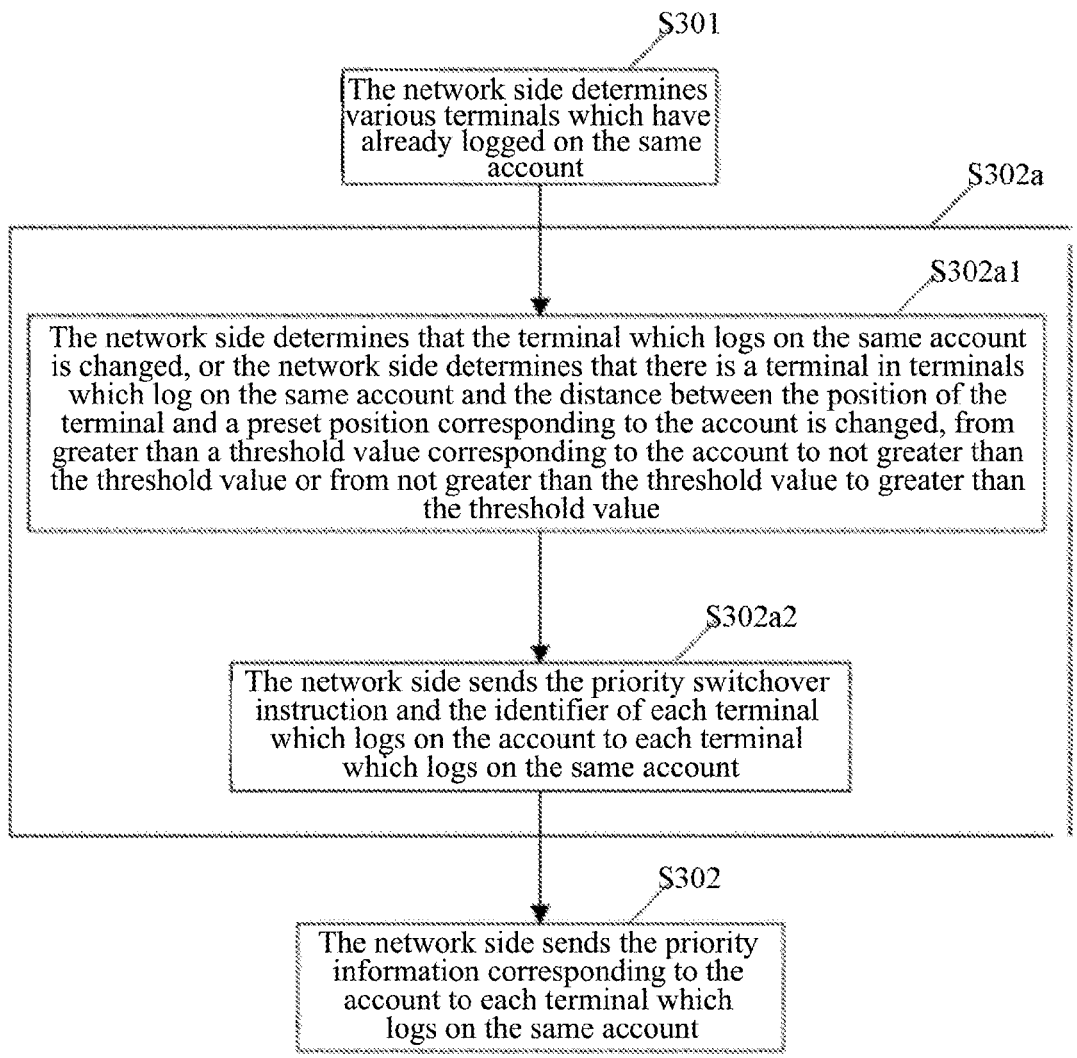
FIG. 5 is a third of the flow charts of a method for sending priority information provided by an embodiment of the present invention.

As shown in FIG. 5, the network side device sends the priority switchover instruction and the identifier of each terminal which logs on the account to each terminal which logs on the account, which can include the following steps.

In S302a1, the network side device determines that the terminal which logs on the account is changed, or the network side device determines that there is a terminal in terminals which log on the account and a distance between the position of the terminal and a preset position corresponding to the account is changed from greater than a threshold value corresponding to the account to not greater than the threshold value or from not greater than the threshold value to greater than the threshold value.

In S302a2, the network side device sends the priority switchover instruction and the identifier of each terminal which logs on the account to each terminal which logs on the account.

The above-mentioned network side device determines that the terminal which logs on the account is changed, referring to that the network side device receives an instruction that the terminal of the highest priority in terminals which log on the account logs out the account or an instruction that a new terminal logs on the account.

Figure 6:
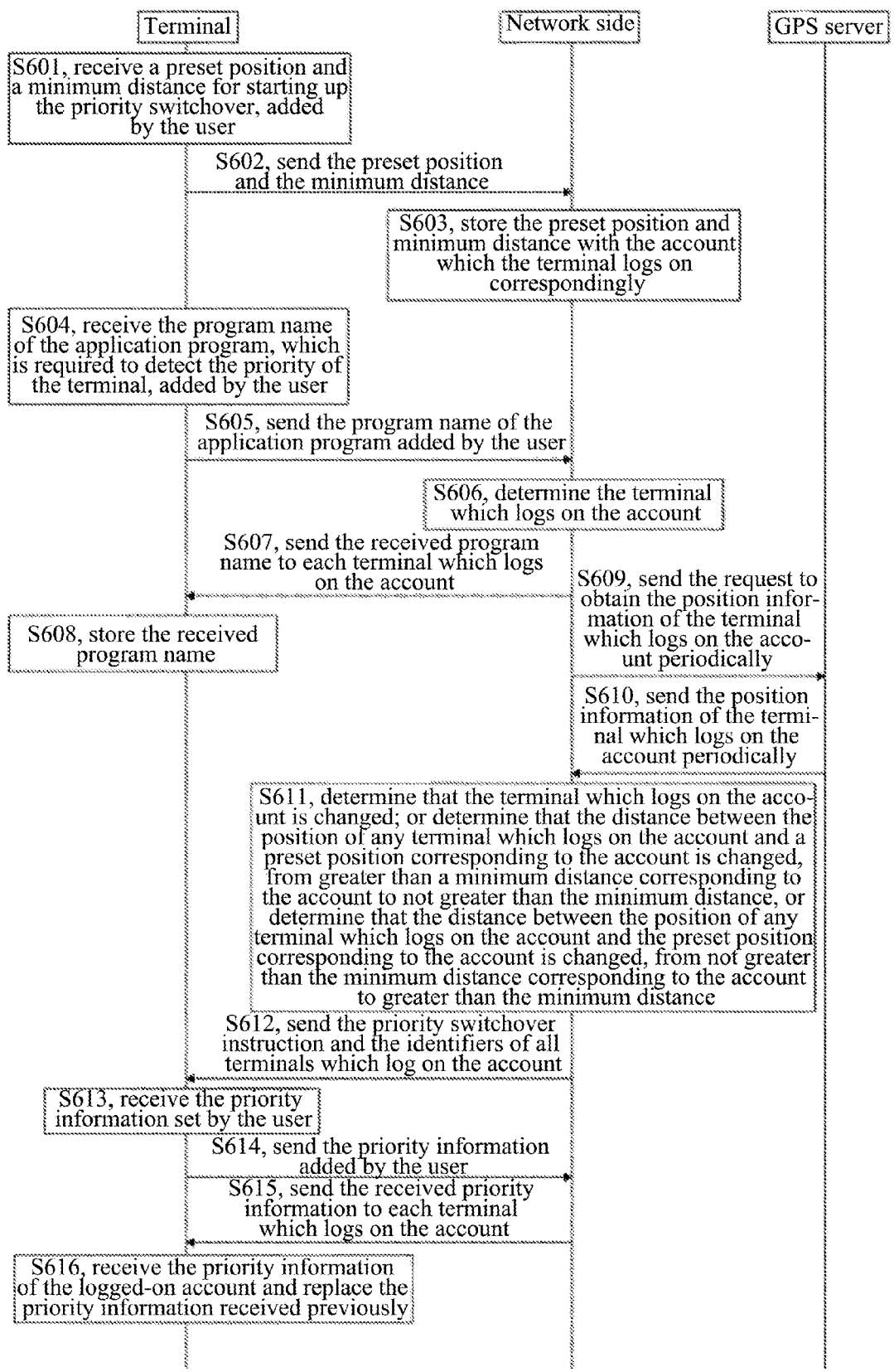
FIG. 6 is a flow chart of a method for sending and receiving priority information in specific application provided by an embodiment of the present invention.

For a certain account in the network side device, FIG. 6 provides the flow chart of the method for sending and receiving priority information in specific application provided by an embodiment of the present invention, including the following steps.

In S601, any terminal logging on the account receives a preset position and a minimum distance for starting up the priority switchover which are added by the user.

In S602, the terminal sends the received preset position and minimum distance for starting up the priority switchover to the network side device.

In S603, the network side device stores the received preset position and minimum distance for starting up the priority switchover with the account correspondingly.

In S604, any terminal logging on the account receives the program name of any application program of the account added by the user and takes it as the application program which is required to detect the priority of the terminal.

In S605, the terminal sends the received program name of the application program which is required to detect the priority of the terminal to the network side device.

In S606, the network side device determines the terminal which logs on the account.

In S607, the network side device sends the program name of the application program which is required to detect the priority of the terminal to each terminal which logs on the account.

In S608, each terminal which logs on the account stores the program name of the application program which is required to detect the priority of the terminal sent by the network side device.

S601, S602, S603, S604, S605, S606, S607 and S608 do not have logical sequence, and it also can be to execute S604, S605, S606, S607 and S608 at first and then execute S601, S602 and S603.

In S609, the network side device sends the request to obtain the position information of each terminal which logs on the account to the GPS server periodically; the terminal which logs on the account needs to start the locating function of GPS.

In S610, the GPS server sends the position information of various terminals which log on the account to the network side device.

In S611, the network side device determines that the terminal which logs on the account is changed; or the network side device determines that the distance between the position of any terminal which logs on the account and a preset position corresponding to the account is changed from greater than a minimum distance for starting up the priority switchover corresponding to the account to not greater than the minimum distance, or the network side device determines that the distance between the position of any terminal which logs on the account and the preset position corresponding to the account is changed from not greater than the minimum distance for starting up the priority switchover corresponding to the account to greater than the minimum distance.

In S612, the network side device sends the priority switchover instruction and the identifiers of all terminals which log on the account to each terminal which logs on the account.

In S613, any terminal which logs on the account receives the priority information set by the user.

In S614, the terminal uploads the received priority information to the network side device as the priority information of the account.

In S615, the network side device sends the priority information of the account to each terminal which logs on the account.

In S616, each terminal which logs on the account receives the priority information of the account and replaces the priority information of the account received previously.

During the specific application, the network side device can be a cloud server, and the cloud server manages the information related to the account. By taking that the terminal A, the terminal B and the terminal C all log on the account S and the account S provides the services of the application program P1, the application program P2 and the application program P3 as an example, it is explained how the priority information is operated during the real application.

Supposing that the terminal A, the terminal B and the terminal C all log on the account S, the user firstly adds the program name of the application program which is required to detect the priority of the terminal in any terminal of the terminal A, the terminal B and the terminal C, and uploads it to the cloud server; for example, the user adds the program names of the application program P1 and the application program P2 as the application program which is required to detect the priority of the terminal, and then the cloud server sends the program names of the application program P1 and the application program P2 to each terminal which logs on the account S, and the terminal A, the terminal B and the terminal C store the received program name with the account S correspondingly.

The user can also add or delete the above-mentioned program name of the application program which is required to detect the priority at any time. After adding or deleting the program name of the application program which is required to detect the priority of the terminal in any terminal, the new program names of the application programs which are required to detect the priority all will be uploaded to the cloud server and then sent to each terminal which logs on the same account with that terminal by the cloud server and stored with the account correspondingly.

The user also needs to add the preset position and the minimum distance for starting up the priority switchover in any terminal in the terminal A, the terminal B and the terminal C and upload them to the cloud server and store them with the account S correspondingly. The cloud server periodically obtains the position information of each terminal which logs on the account S from the Global Positioning System (GPS) server.

The cloud server receives the preset position and the minimum distance for starting up the priority switchover corresponding to the account S, and then the user can move any terminal which logs on the account S. When the distance between the position of any terminal which logs on the account S and the preset position corresponding to the account S determined by the cloud server this time is greater than the minimum distance for starting up the priority switchover corresponding to the account S, and the distance between the position of the terminal and the preset position determined last time is not greater than the minimum distance; or when the distance between the position of any terminal which logs on the account S and the preset position corresponding to the account S determined by the cloud server this time is not greater than the minimum distance for starting up the priority switchover corresponding to the account S, and the distance between the position of the terminal and the preset position determined last time is greater than the minimum distance, the cloud server sends the priority switchover instruction and the identifiers of all terminals which log on the account S to each terminal which logs on the account S.

The terminal A, the terminal B and the terminal C receives the priority switchover instruction and the identifiers of all terminals which log on the account S sent by the cloud server, and then the user can select whether to reset the priority information; after the user selects to reset the priority information, it can also select to set the priorities for the terminal A, terminal B and terminal C in any terminal in the terminal A, the terminal B and the terminal C, and the terminal, after receiving the priority information set by the user, uploads the priority information to the cloud server as the priority information of the account S; and the cloud server sends the priority information to each terminal which logs on the account S, and the terminal A, the terminal B and the terminal C set the values of their own priority identifier bits according to the received priority information respectively.

Supposing that the terminal A is in the highest priority in the terminal A, terminal B and terminal C, after the cloud server receives an instruction that the terminal A logs out the logged account S, the cloud server sends the priority switchover instruction and the identifiers of all terminals which log on the account S to the terminal B and terminal C, that is, the identifiers of the terminal B and terminal C, to wait for the user to reset the priority for the terminal B and the terminal C; the user can select whether to reset the priority information; after the user selects to reset the priority information, it can also select to set the priorities for the terminal B and the terminal C in any terminal in the terminal B and the terminal C, and the terminal, after receiving the priority information set by the user, uploads the priority information to the cloud server as the priority information of the account S; and the cloud server sends the priority information to each terminal which logs on the account S, and the terminal B and the terminal C set the values of their own priority identifier bits according to the received priority information respectively. After the cloud server receives an instruction that the terminal B or the terminal C log out the logged account S, it does not send the priority switchover instruction and the identifiers of all terminals which log on the account S.

Supposing that after the cloud server receives an instruction that the terminal D logs on the account S, the cloud server sends the priority switchover instruction and the identifiers of all terminals which log on the account S to the terminal A, the terminal B, the terminal C and the terminal D, that is, the identifiers of the terminal A, the terminal B, the terminal C and the terminal D, to wait for the user to reset the priority information of the account S; the user can select whether to reset the priority information; after the user selects to reset the priority information, it can also select to set the priorities for the terminal A, the terminal B, the terminal C and the terminal D in any terminal in the terminal A, the terminal B, the terminal C and the terminal D, and the terminal, after receiving the priority information set by the user, uploads the priority information to the cloud server as the priority information of the account S; and then the cloud server sends the priority information to each terminal which logs on the account S, and the terminal A, the terminal B, the terminal C and the terminal D set the values of their own priority identifier bits according to the received priority information respectively.

Based on the same inventive concept, the embodiment of the present invention further provides an apparatus for processing information and an apparatus for sending priority information; because the principle for solving the problem by these apparatus is similar to the above-mentioned method for processing information and method for sending priority information, the implementation of the apparatus can be referred to the implementation of the above-mentioned method, and the repetition will no longer go into details.

Figure 7:
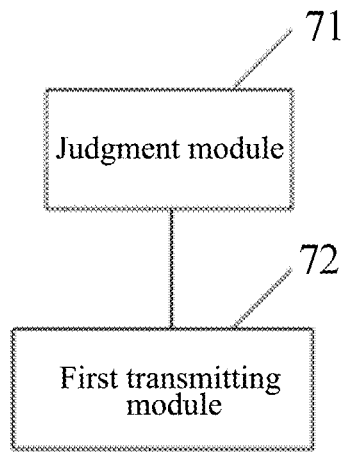
FIG. 7 is a structure diagram of an apparatus for processing information provided by an embodiment of the present invention.

The embodiment of the present invention further provides an apparatus for processing information, as shown in FIG. 7, including the following modules.

A judgment module 71 is configured to: after receiving an instruction that a terminal receives information sent to an account which has already been logged on, according to priority information of the account which is sent by a network side device, judge whether a priority of the terminal is highest; wherein the priority information comprises identifiers of various terminals which log on the account and priorities corresponding to the identifiers.

A first transmitting module 72 is configured to: after determining that the priority of the terminal is highest, send an instruction of starting up an application program corresponding to the received information sent to the account which has already been logged on to the terminal; or else, not send the instruction of starting up the application program corresponding to the received information sent to the account which has already been logged on.

Preferably, the judgment module 71 is further configured to: after receiving the instruction that the terminal receives the information sent to the account which has already been logged on and before determining whether the priority of the terminal is the highest, determine that the application program corresponding to the received information sent to the account which has already been logged on is an application program which is required to detect the priority of the terminal.

Preferably, the judgment module 71 is further configured to: receive the priority information of the account sent from the network side device and replace the priority information corresponding to the account, received previously, sent by the network side device.

Preferably, the judgment module 71 is further configured to: after receiving the priority information of the account sent by the network side device, receive the priority switchover instruction and the identifier of the terminal logging on the account sent by the network side device, and start up a priority switchover program, and send priority information set by the user to the network side device after determining that the user needs to perform the priority switchover.

Figure 8:
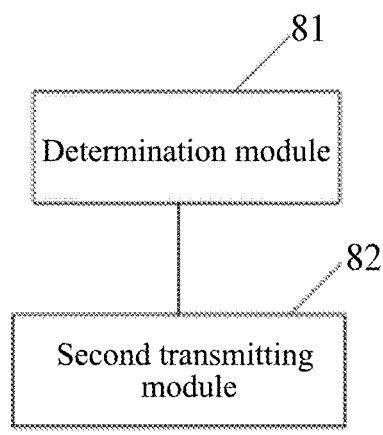
FIG. 8 is structure diagram of an apparatus for sending priority information provided by an embodiment of the present invention.

The embodiment of the present invention further provides an apparatus for sending priority information, as shown in FIG. 8, including: a determination module 81, configured to: determine various terminals which have already logged on a same account;

a second transmitting module 82, configured to: for various terminals logging on the same account, send priority information of the account to various terminals, wherein the priority information comprises identifiers of various terminals which log on the account and priorities corresponding to the identifiers.

Preferably, the second transmitting module 82 is further configured to: before sending the priority information of the account which has already been logged on by the terminal to the terminal, send a priority switchover instruction and an identifier of each terminal which logs on the account to each terminal which logs on the same account; wherein the priority switchover instruction and the identifier of each terminal which logs on the account are used for notifying each terminal which logs on the account to start up the priority switchover program and send the priority information set by the user, including a corresponding relation of the identifiers and priorities of terminals which have already logged on the account, to the network side device after determining that the user needs to perform the priority switchover.

Preferably, the second transmitting module 82 is further configured to: send the priority switchover instruction and the identifier of each terminal which logs on the account to each terminal which logs on the same account after determining that the terminal which logs on the same account is changed; or after determining that there is a terminal in terminals which log on the same account and a distance between the position of the terminal and a preset position corresponding to the account is changed from greater than a threshold value corresponding to the account to not greater than the threshold value, or from not greater than the threshold value to greater than the threshold value, send the priority switchover instruction and the identifier of each terminal which logs on the account to each terminal which logs on the same account.

Through the description of the above-mentioned execution modes, those skilled in the art can clearly know that the present document can be realized through the hardware, and also can be realized through the mode of the software added with the essential common hardware platform. Based on such understanding, the technical scheme of the embodiment of the present invention can be embodied in the form of the software product, and the software product can be stored in a non-volatile storage medium (it can be a CD-ROM, a U disc, a mobile hard disk, etc.), including several instructions used for making one computer device (it can be a personal computer, a server, or a network device, etc.) execute the method in each embodiment of the present invention.

Those skilled in the art can understand that the accompanying drawings are only a diagram of one preferred embodiment, and the module or procedure in the accompanying drawings might not be necessary for implementing the present application.

Those skilled in the art can understand that the module in the apparatus in the embodiment can be distributed in the apparatus of the embodiment according to the description of the embodiment, and also can be changed correspondingly to be located in one or more apparatus different from the present embodiment. The modules of the above-mentioned embodiment can be merged into one module, and can further be split into multiple sub-modules.

The sequence numbers of the above-mentioned embodiments of the present invention are only for description, while not representing the pros and cons of the embodiments.

Obviously, those skilled in the art can perform various changes and modifications to the present document without departing from the spirit and the range of the present document. In this way, if these changes and modifications of the present document are within the range of the claims of the present document and their equivalent technologies, then the present document intends to include these changes and modifications as well.

INDUSTRIAL APPLICABILITY

The embodiment of the present invention improves the privacy and the security of the private information of the user using the account.

What we claim is:

1. A method for processing information, comprising:
receiving, by a terminal, information sent to an account which has already been logged on, wherein the information corresponds to an application program;
determining, by the terminal, whether a priority of the terminal is highest according to priority information of the account, wherein the priority information is sent by a network side device and comprises identifiers of multiple terminals which log on the account and priorities corresponding to the identifiers;
if the priority of the terminal is the highest, then starting up the corresponding application program according to the received information sent to the account; if the priority of the terminal is not the highest, not starting up the application program corresponding to the received information sent to the account;
wherein before the terminal receives the priority information of the account, the method further comprises: receiving, by the terminal, from the network side device a priority switchover instruction and the identifiers of the multiple terminals logging on the account, and starting up a priority switchover program, and sending priority information set by a user to the network side device after determining that the user needs to perform the priority switchover;
wherein the network side device sending the priority switchover instruction and the identifiers of the multiple terminals to the terminal, comprises:
sending, by the network side device, the priority switchover instruction and the identifiers of the multiple terminals to each of the multiple terminals after determining that at least one of the multiple terminals is changed; or
after the network side device determines that a distance between a position of a terminal in the multiple terminals and a preset position corresponding to the account is changed from greater than a threshold value corresponding to the account to not greater than the threshold value, or from not greater than the threshold value to greater than the threshold value, sending the priority switchover instruction and the identifiers of the multiple terminals to each of the multiple terminals.

2. The method according to claim 1, wherein after the terminal receives the information sent to the account which has already been logged on and before the terminal determines whether the priority of the terminal is the highest, the method further comprises:
determining, by the terminal, that the application program corresponding to the received information is an application program which is required to detect the priority of the terminal.

3. The method according to claim 1, further comprising:
after the terminal receives the priority information of the account, updating previous priority information of the account which is received last time.

4. A method for sending priority information, comprising:
determining, by a network side device, multiple terminals which have already logged on a same account;
for the multiple terminals logging on the same account, sending, by the network side device, priority information of the account to the multiple terminals respectively, wherein the priority information comprises identifiers of the multiple terminals and priorities corresponding to the identifiers;
wherein before the network side device sends the priority information of the account to the terminal, the method further comprises: sending, by the network side device, to each terminal which logs on the account a priority switchover instruction and the identifiers of the multiple terminals, wherein the priority switchover instruction and the identifiers of the multiple terminals are used for notifying said each terminal to start up a priority switchover program and send priority information set by a user to the network side device after determining that the user needs to perform the priority switchover;

wherein the network side device sending the priority switchover instruction and the identifiers of the multiple terminals to each terminal, comprises:

sending, by the network side device, the priority switchover instruction and the identifiers of the multiple terminals to each of the multiple terminals after determining that at least one of the multiple terminals is changed; or after the network side device determines that a distance between a position of a terminal in the multiple terminals and a preset position corresponding to the account is changed from greater than a threshold value corresponding to the account to not greater than the threshold value, or from not greater than the threshold value to greater than the threshold value, sending the priority switchover instruction and the identifiers of the multiple terminals to each of the multiple terminals.

5. A terminal, comprising a processor and a storage device storing computer executable instructions that when executed by the processor cause the processor to execute following modules:

a judgment module, configured to:
  receive an instruction that the terminal receives information sent to an account which has already been logged on, wherein the information corresponds to an application program; and
  determine whether a priority of the terminal is highest according to priority information of the accounts wherein the priority information is sent by a network side device and comprises identifiers of multiple terminals which log on the account and priorities corresponding to the identifiers; and a first transmitting module, configured to:
  after determining that the priority of the terminal is the highest, send to the terminal an instruction of starting up the application program corresponding to the received information sent to the account; and
  when determining that the priority of the terminal is not the highest, not send the instruction of starting up the application program corresponding to the received information sent to the account;

wherein the judgment module is further configured to:
  before receiving the priority information of the account, receive from the network side device a priority switchover instruction and the identifiers of the multiple terminals logging on the account after the network side device determines that at least one of the multiple terminals is changed or after the network side device determines that a distance between a position of a terminal in the multiple terminals and a preset position corresponding to the account is changed from greater than a threshold value corresponding to the account to not greater than the threshold value, or from not greater than the threshold value to greater than the threshold value, start up a priority switchover program, and
  send priority information set by a user to the network side device after determining that the user needs to perform the priority switchover.

6. The terminal according to claim 5, wherein the judgment module is further configured to:
  after receiving the instruction that the terminal receives the information sent to the account which has already been logged on and before determining whether the priority of the terminal is the highest, determine that the application program corresponding to the received information is an application program which is required to detect the priority of the terminal.

7. The terminal according to claim 5, wherein the judgment module is further configured to:
  receive the priority information of the account, and update the previous priority information of the account which is received last time.

8. An apparatus for sending priority information, comprising a processor and a storage device storing computer executable instructions that when executed by the processor cause the processor to execute following modules:

a determination module, configured to: determine multiple terminals which have already logged on a same account; and a second transmitting module, configured to: for the multiple terminals logging on the same account, send priority information of the account to the multiple terminals respectively, wherein the priority information comprises identifiers of the multiple terminals and priorities corresponding to the identifiers;

wherein the second transmitting module is further configured to: before sending the priority information of the account to the terminal, send to each terminal which logs on the account a priority switchover instruction and the identifiers of the multiple terminals, wherein the priority switchover instruction and the identifiers of the multiple terminals are used for notifying said each terminal to start up a priority switchover program and send priority information set by a user to the network side device after determining that the user needs to perform the priority switchover;

wherein the second transmitting module is further configured to:

send the priority switchover instruction and the identifiers of the multiple terminals to each of the multiple terminals after determining that at least one of the multiple terminals is changed; or after determining that a distance between a position of a terminal in the multiple terminals and a preset position corresponding to the account is changed from greater than a threshold value corresponding to the account to not greater than the threshold value, or from not greater than the threshold value to greater than the threshold value, send the priority switchover instruction and the identifiers of the multiple terminals to each of the multiple terminals.

* * * * *